United States Patent
Kim et al.

(10) Patent No.: US 9,633,248 B2
(45) Date of Patent: Apr. 25, 2017

(54) METHOD AND MOBILE DEVICE FOR FINGERPRINT AUTHENTICATION

(71) Applicant: Samsung Electronics Co., Ltd., Gyeonggi-do (KR)

(72) Inventors: Hyun Kyoung Kim, Seoul (KR); Seong Sig Kang, Gyeonggi-do (KR); Ki Hong Min, Seoul (KR)

(73) Assignee: SAMSUNG ELECTRONICS CO., LTD, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/540,949

(22) Filed: Nov. 13, 2014

(65) Prior Publication Data

US 2015/0131878 A1    May 14, 2015

(30) Foreign Application Priority Data

Nov. 13, 2013   (KR) .................... 10-2013-0137563

(51) Int. Cl.
*G06K 9/00* (2006.01)
*G06K 9/32* (2006.01)

(52) U.S. Cl.
CPC ..... *G06K 9/00073* (2013.01); *G06K 9/00067* (2013.01); *G06K 9/3208* (2013.01)

(58) Field of Classification Search
None
See application file for complete search history.

(56) References Cited

U.S. PATENT DOCUMENTS

| | | | |
|---|---|---|---|
| 6,546,122 B1* | 4/2003 | Russo | G06K 9/00026 382/125 |
| 2006/0078176 A1* | 4/2006 | Abiko | G06F 3/03547 382/124 |
| 2012/0303476 A1* | 11/2012 | Krzyzanowski | G06F 8/60 705/26.5 |
| 2014/0003678 A1* | 1/2014 | Vieta | G06K 9/00026 382/124 |
| 2014/0056493 A1* | 2/2014 | Gozzini | G06K 9/00087 382/124 |
| 2014/0219520 A1* | 8/2014 | Myers | G06K 9/6255 382/124 |
| 2015/0135108 A1* | 5/2015 | Pope | G06K 9/00006 715/767 |
| 2016/0021238 A1* | 1/2016 | Abramson | H04W 48/04 455/418 |

FOREIGN PATENT DOCUMENTS

KR    10-2011-0057449    6/2011

* cited by examiner

*Primary Examiner* — Siamak Harandi
*Assistant Examiner* — Mai Tran

(57) ABSTRACT

According to a fingerprint authentication method, fingerprint data is obtained through a fingerprint sensor, a degree of rotation of an electronic device including the fingerprint sensor when the fingerprint data is obtained is detected, a pattern of minutiae is extracted from the fingerprint data, a registration pattern for a registered fingerprint is rotated based on the degree of rotation, the pattern of minutiae is matched to the registration pattern, and the fingerprint data is authenticated on the basis of a match result.

17 Claims, 15 Drawing Sheets

(DEFAULT DIRECTION)

(90-DEGREE ROTATION)

(DEFAULT DIRECTION)

(90-DEGREE ROTATION)

METHOD AND MOBILE DEVICE FOR FINGERPRINT AUTHENTICATION

CROSS-REFERENCE TO RELATED APPLICATION(S) AND CLAIM OF PRIORITY

The present application is related to and claims priority of Korean patent application No. 10-2013-0137563 filed Nov. 13, 2013, the disclosure of which is hereby incorporated in its entirety by reference.

TECHNICAL FIELD

The present disclosure relates to a method and device for fingerprint authentication and a mobile terminal for performing the method.

BACKGROUND

As the number of mobile devices used such as laptop computers and smartphones increases, information security becomes more important. Various biometric technologies to be applied to mobile devices have been developed in order to enhance security. In particular, because fingerprint authentication technology may obtain security at low cost, and fingerprint sensors may be made smaller in size, fingerprint authentication technology is widely used.

SUMMARY

To address the above-discussed deficiencies, it is a primary object to provide a fingerprint authentication method and a device and a terminal for performing the method.

According to an embodiment of the present invention, a fingerprint authentication method includes obtaining fingerprint data through a fingerprint sensor, detecting a degree of rotation of an electronic device including the fingerprint sensor when the fingerprint data is obtained, extracting a pattern of minutiae from the fingerprint data, rotating either a registration pattern for a registered fingerprint based on the degree of rotation, matching the pattern to the rotated registration pattern, and authenticating the fingerprint data on the basis of a match result.

The fingerprint authentication method may further include expanding the registration pattern by adding an unregistered pattern of minutiae not shown in the registration pattern among the minutiae of the pattern, to the registration pattern when the fingerprint data is authenticated; and storing the expanded registration pattern.

The fingerprint authentication method may further include registering the registration pattern, wherein the registering-the-registration-pattern includes obtaining first fingerprint registration data through the fingerprint sensor, obtaining second fingerprint registration data through the fingerprint sensor, extracting a first registration pattern from the first fingerprint registration data, extracting a second registration pattern from the second fingerprint registration data; matching the second registration pattern to the first registration pattern, generating the registration pattern by adding a pattern of minutiae not shown in the first registration pattern among minutiae of the second registration pattern, to the first registration pattern, and storing the registration pattern.

Furthermore, the fingerprint authentication method may further include: providing a guide for indicating a fingerprint sensing direction corresponding to the degree of rotation.

A computer-readable recording medium in which a program for performing the fingerprint authentication method in a computer is recorded may be provided.

According to another embodiment of the present disclosure, a fingerprint authentication device includes a fingerprint sensor configured to obtain a fingerprint data, a pattern extraction unit configured to extract a pattern of minutiae from the fingerprint data, a storage unit configured to store a registration pattern for a registered fingerprint, a pattern matching unit configured to match the pattern of minutiae to the registration pattern, authenticate the fingerprint data on the basis of a match result, and transmit an unregistered pattern of minutiae not shown in the registration pattern among the minutiae of the pattern, to a pattern transformation unit, and the pattern transformation unit configured to expand the registration pattern by adding the unregistered pattern of minutiae to the registration pattern.

According to another embodiment of the present disclosure, a mobile terminal includes: a fingerprint sensor configured to obtain a fingerprint data; a magnetic sensor; an acceleration sensor; a rotation detection unit configured to detect a degree of rotation of the mobile terminal when the fingerprint is obtained by the fingerprint sensor by using the magnetic sensor or the acceleration sensor; a pattern extraction unit configured to extract a pattern of minutiae from the fingerprint data; a storage unit configured to store a registration pattern for a registered fingerprint; a pattern transformation unit configured to rotate the registration pattern based on the degree of rotation of the mobile terminal when the fingerprint is obtained; and a pattern matching unit configured to match the pattern of minutiae to the registration pattern, and authenticate the fingerprint data on the basis of a match result.

Before undertaking the DETAILED DESCRIPTION below, it may be advantageous to set forth definitions of certain words and phrases used throughout this patent document: the terms "may" and "can" are used interchangeably and are used in a permissive sense (i.e., meaning having the potential to), rather than the mandatory sense (i.e., meaning must); the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
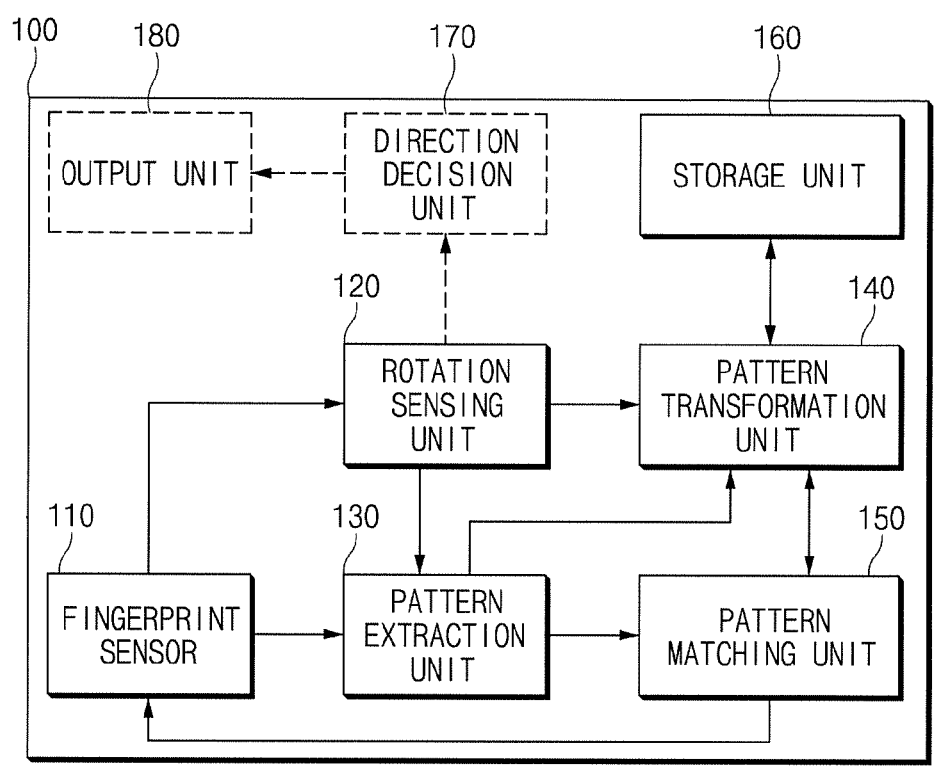
FIG. 1 is a block diagram illustrating a fingerprint authentication device according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter the present disclosure will be described in detail with reference to the accompanying drawings. Like reference numerals refer to like elements throughout. Detailed descriptions of known functions and/or configurations will not be provided. The following description is focused on operations of various embodiments, and unnecessary descriptions that may obscure the gist of the description will not be provided.

In the drawings, some elements may be exaggerated, omitted, or schematically illustrated. The sizes of elements in the drawings do not reflect the actual sizes of the elements. Therefore, the present disclosure is not limited to the relative sizes or distances among the elements illustrated in the drawings.

FIG. 1 is a block diagram illustrating a fingerprint authentication device according to an embodiment of the present disclosure. Referring to FIG. 1, a fingerprint authentication device 100 can include a fingerprint sensor 110, a rotation sensing unit 120, a pattern extraction unit 130, a pattern transformation unit 140, a pattern matching unit 150, and a storage unit 160. According to an embodiment, the fingerprint authentication device 100 can further include a direction decision 170 and an output unit 180.

The fingerprint authentication device 100 according to the present embodiment can determine whether a fingerprint that corresponds with a sensed fingerprint is registered in order to perform fingerprint authentication. The fingerprint authentication device 100 according to the present embodiment can be included in a mobile phone, a smartphone, a notebook computer, a terminal for digital broadcast, a digital camera, a portable game terminal, a personal digital assistant (PDA), a portable multimedia player (PMP), a navigator, and a tablet personal computer (PC). However, the fingerprint authentication device 100 is not limited thereto, and can be included in any electronic device which requires security, such as data communication device or multimedia device and an application device therefor.

The fingerprint sensor 110 senses a fingerprint. When an object having a dielectric constant of a human being is detected, the fingerprint sensor 110 senses the object. The fingerprint sensor 110 can sense a form of a valley between ridges, and fingerprint data obtained through the sensing can have a form of a signal. The fingerprint data can be formed as a fingerprint image through image processing. The fingerprint sensor 110 transmits the obtained fingerprint data to the pattern extraction unit 130 in order to perform image processing and fingerprint authentication.

A fingerprint can be sensed by the fingerprint sensor 110 in a swipe manner or a touch manner. According to the swipe manner, a surface of a finger with a fingerprint is positioned on the fingerprint sensor 110 and then is swiped thereon in a predetermined direction. According to the touch manner, the surface of the finger is contacted onto the fingerprint sensor 110 for a predetermined period of time. Hereinafter it is assumed that a fingerprint is sensed by the fingerprint sensor 110 in the swipe manner for convenience of explanation. However, the present disclosure is not limited thereto, and thus, a fingerprint can be sensed by the fingerprint sensor 110 in the touch manner.

The rotation sensing unit 120 (for example, rotation sensor) detects a degree of rotation of an electronic device including the fingerprint sensor 110. The electronic device can include a mobile phone, a smartphone, a notebook computer, a terminal for digital broadcast, a digital camera, a portable game terminal, a personal digital assistant (PDA), a portable multimedia player (PMP), a navigator, and a tablet personal computer (PC). However, the electronic device is not limited thereto, and can include any data communication device or multimedia device and an application device therefor which include a fingerprint authentication device. Hereinafter it is assumed that the electronic device is the fingerprint authentication device 100 for convenience of explanation. The rotation sensing unit 120 can detect how much the fingerprint authentication device 100 rotates from a default direction. The degree of rotation can include a rotation angle. According to an embodiment, the rotation sensing unit 120 can detect the degree of rotation of a fingerprint when the fingerprint is sensed, or can detect the degree of rotation of the fingerprint authentication device 100 when the fingerprint authentication device 100 rotates. The rotation sensing unit 120 can include an acceleration sensor or a magnetic sensor and a rotation detection unit for detecting the degree of rotation by using data obtained from the acceleration sensor or magnetic sensor.

The pattern extraction unit 130 extracts a pattern of minutiae for sensed fingerprint from the fingerprint data obtained by the fingerprint sensor 110. Hereinafter, for convenience of explanation, the pattern of minutiae extracted from the fingerprint data obtained for fingerprint authentication by the pattern extraction unit 130 is referred to as a sensing pattern, and a pattern of minutiae for a registered fingerprint is referred to as a registration pattern.

The pattern of minutiae for the registered fingerprint can be extracted from fingerprint registration data obtained through fingerprint registration.

The pattern extraction unit 130 can reconfigure the fingerprint data received from the fingerprint sensor 110 into a fingerprint image. The pattern extraction unit 130 can extract minutiae from the fingerprint image obtained through the reconfiguration, and generate the sensing pattern including the extracted minutiae. Further detailed descriptions about the extraction of the minutiae from the fingerprint image will be provided with reference to FIG. 2.

The pattern transformation unit 140 transforms the registration pattern. According to an embodiment, the pattern transformation unit 140 can rotate or expand the registration pattern.

According to an embodiment, the pattern transformation unit 140 can rotate the registration pattern according to the degree of rotation of the fingerprint authentication device 100. That is, the pattern transformation unit 140 rotates the registration pattern according to the degree of rotation of the fingerprint authentication device 100 so that the fingerprint authentication is enabled even though a sensing direction of a fingerprint is changed due to the rotation of the fingerprint authentication device 100. Further detailed descriptions about the change of the fingerprint sensing direction will be provided with reference to FIG. 3.

According to another embodiment, the pattern transformation unit 140 can add a partial pattern to the registration pattern to expand the registration pattern. Further detailed descriptions about the expanding the registration pattern will be provided with reference to FIGS. 4 to 6.

The pattern matching unit 150 can match two or more patterns to each other. In the case of the fingerprint authentication, the pattern matching unit 150 matches the sensing pattern to the registration pattern. The pattern matching unit 150 authenticates the received fingerprint data on the basis of a matching result of the sensing pattern. For example, the pattern matching unit 150 can authenticate that a fingerprint of the received fingerprint data is the same as a registered fingerprint when the number of minutiae of the sensing pattern which correspond with those of the registration pattern is not less than a predetermined value. The predetermined value can be determined based on a fingerprint recognition rate. Further detailed descriptions about the matching the sensing pattern to the registration pattern will be provided with reference to FIG. 5. However, the present disclosure is not limited to the number of minutiae, and thus the pattern matching unit 150 can determine whether the sensing pattern corresponds with the rotated registration pattern on the basis of other factor such as the number of lines between minutiae and shape of the minutiae.

In the case of the fingerprint registration, the pattern matching unit 150 matches second to Nth registration patterns to a first registration pattern. Further detailed descriptions about the matching the registration patterns to each other will be provided with reference to FIG. 6.

The pattern extraction unit 130, the pattern transformation unit 140, and the pattern matching unit 150 according to the present embodiment can correspond to or include at least one processor.

The storage unit 160 stores registration patterns. The storage unit 160 can be a typical storage medium that stores data or a program needed to extract, transform, and match patterns from fingerprint data of the fingerprint authentication device 100. The storage unit 160 according to the present embodiment can be implemented with a hard disk drive (HDD), a read only memory (ROM), a random access memory (RAM), a flash memory, a memory card, or a solid state drive (SDD).

According to an embodiment of the present disclosure, the fingerprint authentication device 100 can further include the direction decision 170 and the output unit 180.

The direction decision 170 can suggest a fingerprint sensing direction. According to an embodiment, the direction decision 170 suggests the fingerprint sensing direction corresponding to the degree of rotation of the fingerprint authentication device 100. The fingerprint sensing direction corresponding to the degree of rotation can be predetermined according to the degree of rotation. For example, the fingerprint sensing direction corresponding to the degree of rotation can be determined as a direction that allows fingerprint sensing to be performed most easily on the rotated fingerprint authentication device 100. Alternatively, the fingerprint sensing direction corresponding to the degree of rotation can be determined as a direction that allows a fingerprint to be sensed by the fingerprint sensor 110 by simply changing a sensing direction of a finger without repositioning a hand from which the fingerprint is sensed according to the degree of rotation of the fingerprint authentication device 100. Further detailed descriptions about this operation will be provided with reference to FIG. 3. The direction decision 170 can provide a guide for indicating the fingerprint sensing direction corresponding to the received degree of rotation according to the rotation of the electronic device.

The output unit 180 outputs the guide received from the direction decision 170. According to an embodiment, when the fingerprint sensing direction does not correspond with the degree of rotation of obtained fingerprint data, the output unit 180 can output a request for requesting fingerprint sensing again according to the guide. According to another embodiment, the output unit 180 can output a voice, a letter, a picture, or a video indicating whether the fingerprint authentication is successful or not. The output unit 180 can be implemented with a display panel, a touch screen, a speaker, and a vibration sensor.

Figure 2A:
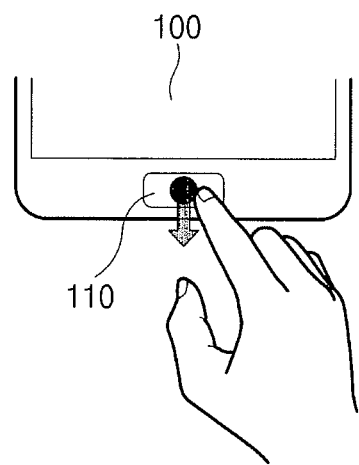
FIGS. 2A to 2C are diagrams illustrating that minutiae are extracted from a fingerprint image according to an embodiment of the present disclosure.
Figure 2B:
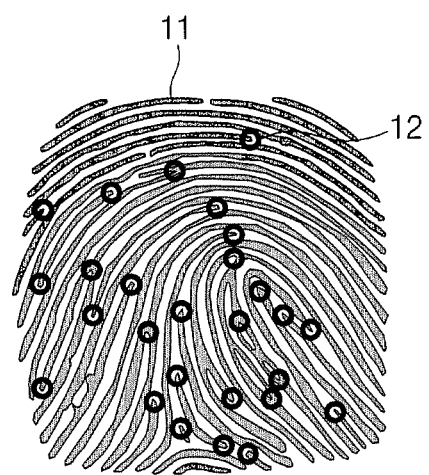
Figure 2C:
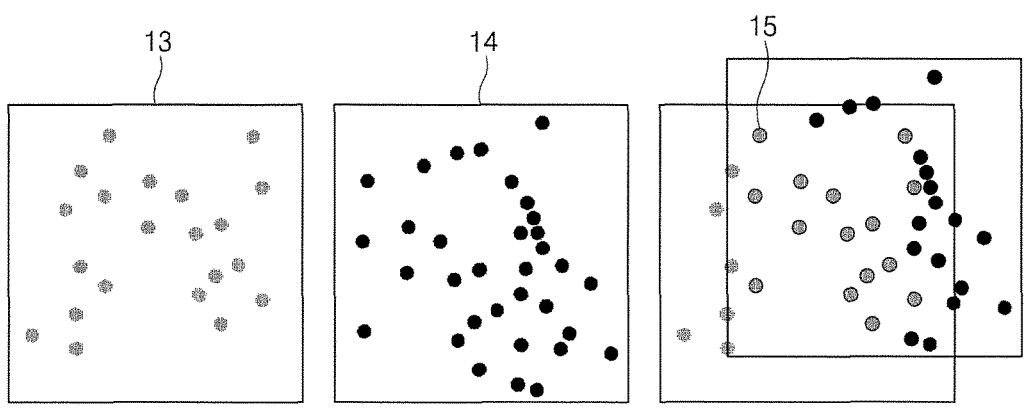

FIGS. 2A to 2C are diagrams illustrating that minutiae are extracted from a fingerprint image according to an embodiment of the present disclosure.

FIG. 2A is a diagram illustrating that fingerprint sensing is performed by the fingerprint sensor 110 in the fingerprint authentication device 100. A fingerprint can be sensed by the fingerprint sensor 110 of FIG. 2A to 2C in the swipe manner. According to the swipe manner, a surface of a finger with a fingerprint is positioned on the fingerprint sensor 110 and then is swiped thereon in the direction of the arrow of FIG. 2. Fingerprint data can be obtained by the sensing operation of the fingerprint sensor 110.

FIG. 2C illustrates a fingerprint image 11 obtained by reconfiguring the fingerprint data. The fingerprint sensor 110 can sense forms of ridges and valleys, and the fingerprint data obtained through the sensing can have a form of a signal. The fingerprint data can be reconfigured to be the fingerprint image 11 through image processing. As illustrated in FIG. 2, a fingerprint has ridges and a valleys disposed therebetween. As illustrated in FIGS. 2A to 2C, a branch point of a ridge, an end point thereof, and the like can be extracted as minutiae 12 so as to be used for the fingerprint authentication. The fingerprint authentication can be performed based on whether the minutiae of a sensed fingerprint correspond with those of a registered fingerprint. The fingerprint authentication device 100 can extract a sensing pattern including the minutiae 12 of the fingerprint image 11. The sensing pattern can be matched to a registration pattern including minutiae for a registered fingerprint so as to determine whether the two patterns correspond with each other.

FIG. 2C illustrates that a sensing pattern is matched to a registration pattern. The fingerprint authentication device 100 can match a sensing pattern 13 to a registration pattern 14 so as to determine whether the minutiae of the sensing pattern 13 correspond with those of the registration pattern 14. The fingerprint authentication device 100 authenticates the sensed fingerprint on the basis of a matching result of the sensing pattern. For example, the fingerprint authentication device 100 can authenticate that a fingerprint of received fingerprint data is the same as a registered fingerprint when the number of minutiae 15 of the sensing pattern which correspond with those of the registration pattern is not less than a predetermined value. The predetermined value can be determined based on a fingerprint recognition rate. However, the present disclosure is not limited to the number of minutiae, and thus the fingerprint authentication device 100 can determine whether the sensing pattern corresponds with the rotated registration pattern on the basis of other factor such as the number of lines between minutiae and shape of the minutiae.

FIGS. 3A to 3D are diagrams illustrating that a sensing direction of a fingerprint is changed according to rotation of the fingerprint authentication device.

Figure 3A:
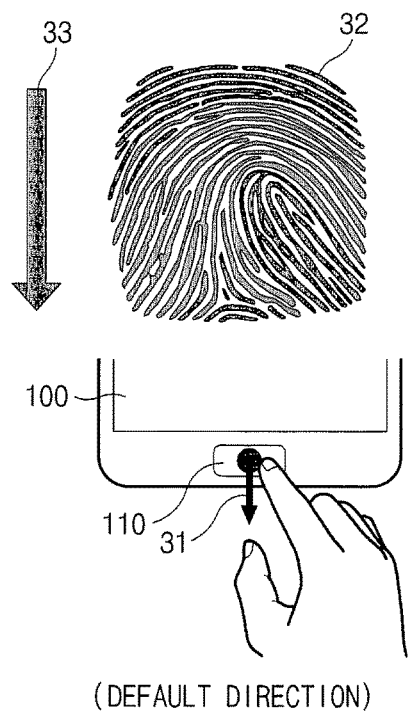
FIGS. 3A to 3D are diagrams illustrating that a sensing direction of a fingerprint is changed according to rotation of a fingerprint authentication device.
Figure 3B:
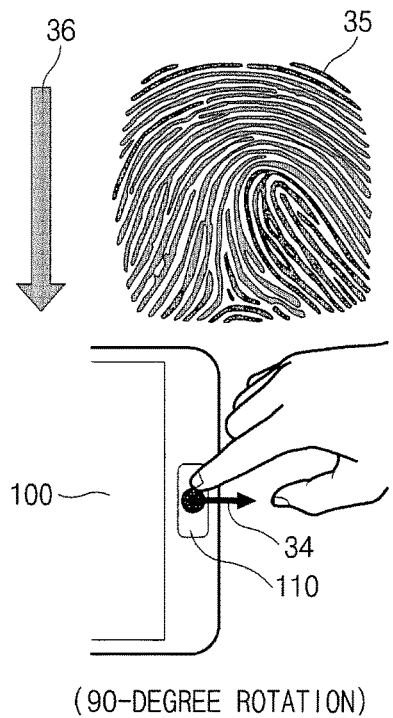

FIGS. 3A and 3B illustrate that a fingerprint is sensed by a conventional fingerprint authentication device. In FIG. 3A, an arrow direction 31 indicates a fingerprint swipe direction set as a default direction in the fingerprint authentication device. A finger is swiped on a fingerprint sensor in the arrow direction 31 in order to authenticate a fingerprint. When the finger is swiped in the arrow direction 31, a fingerprint image 32 is formed in an arrow direction 33. That is, the sensing direction of the fingerprint is a vertical direction of the fingerprint.

FIG. 3B illustrates a case where the fingerprint authentication device is rotated about 90 degrees. The fingerprint authentication device of FIG. 3B does not have a function of rotating a registration pattern according to rotation of the fingerprint authentication device 100. Therefore, a fingerprint image 35 should be obtained in the same direction. That is, a fingerprint should be sensed in a vertical direction of the fingerprint as indicated by an arrow direction 36. The swipe direction should be an arrow direction 34 in which a finger is away from the fingerprint authentication device. This swipe direction causes inconvenience to a user.

Figure 3C:
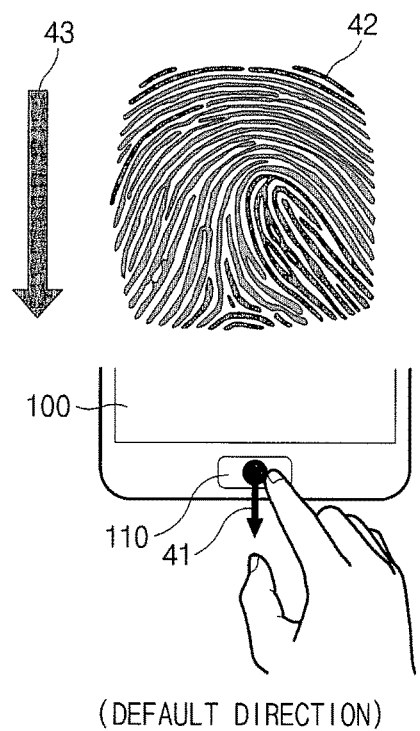
Figure 3D:
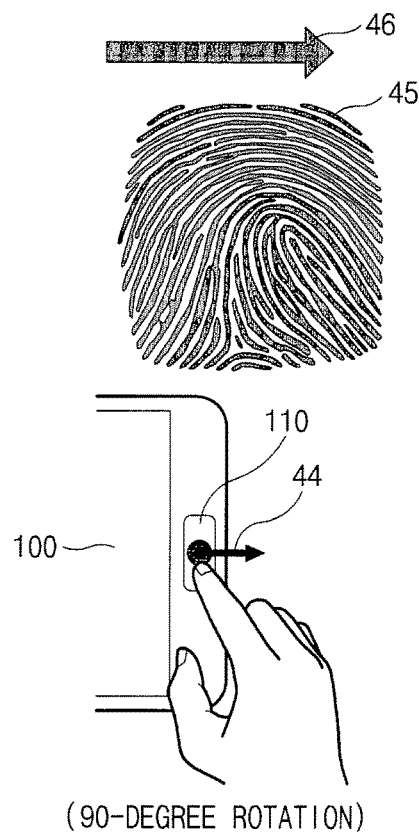

FIGS. 3C and 3D illustrate that a fingerprint is sensed by the fingerprint authentication device 100 according to an embodiment of the present disclosure. In FIG. 3C, an arrow direction 41 indicates a fingerprint swipe direction set as a default direction in the fingerprint authentication device 100. A finger is swiped on a fingerprint sensor in the arrow direction 41 in order to authenticate a fingerprint. When the finger is swiped in the arrow direction 41, a fingerprint image 42 is formed in an arrow direction 43. That is, the sensing direction of the fingerprint is a vertical direction of the fingerprint.

FIG. 3D illustrates a case where the fingerprint authentication device is rotated about 90 degrees. The fingerprint authentication device 100 of the present disclosure rotates a registration pattern according to rotation of the fingerprint authentication device 100. Therefore, it is not necessary to obtain a fingerprint image 45 in the same direction.

In FIG. 3D, when the finger is swiped in an arrow direction 44, the sensing direction of the fingerprint can be an arrow direction 46 on a fingerprint image 45. That is, the sensing direction can be changed to a horizontal direction of the fingerprint. Since the fingerprint authentication device 100 has a function of rotating a registration pattern according to rotation of the fingerprint authentication device 100, the fingerprint authentication can be performed normally even though the sensing direction of the fingerprint is changed.

Since the fingerprint sensing is performed by simply changing the sensing direction from the vertical direction to the horizontal direction, i.e., the arrow direction 44, at the same position of a hand as that of FIG. 3C, convenience of a user can be improved.

Since the fingerprint authentication device 100 according to the present embodiment rotates a registration pattern according to rotation of the fingerprint authentication device 100, the fingerprint authentication device 100 can change the sensing direction to a direction that allows the user to swipe a finger more easily.

Therefore, the fingerprint authentication device 100 can determine a fingerprint sensing direction that allows a fingerprint to be sensed by the fingerprint sensor 110 by simply changing a sensing direction of a finger without repositioning a hand from which the fingerprint is sensed according to the degree of rotation of the fingerprint authentication device 100.

Figure 4:
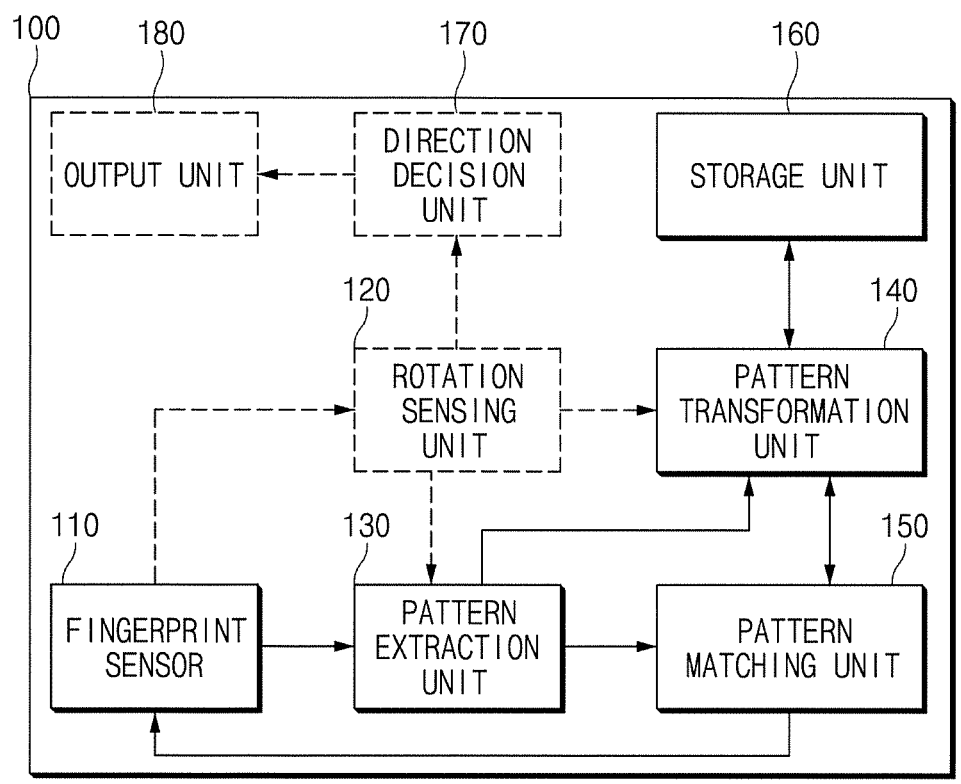
FIG. 4 is a block diagram illustrating a fingerprint authentication device according to an embodiment of the present disclosure.

FIG. 4 is a block diagram illustrating a fingerprint authentication device according to an embodiment of the present disclosure. Referring to FIG. 4, a fingerprint authentication device 100 can include a fingerprint sensor 110, a pattern extraction unit 130, a pattern transformation unit 140, a pattern matching unit 150, and a storage unit 160. According to an embodiment, the fingerprint authentication device 100 can further include a rotation sensing unit 120, a direction decision 170, and an output unit 180.

The fingerprint authentication device 100 can determine whether a fingerprint that corresponds with a sensed fingerprint is registered in order to perform fingerprint authentication.

The fingerprint sensor 110 senses a fingerprint. The fingerprint sensor 110 transmits obtained fingerprint data to the pattern extraction unit 130 in order to perform image processing and fingerprint authentication.

The pattern extraction unit 130 extracts a pattern of minutiae for sensed fingerprint from the fingerprint data obtained by the fingerprint sensor 110. The pattern extraction unit 130 can reconfigure the fingerprint data received from the fingerprint sensor 110 into a fingerprint image. The pattern extraction unit 130 can extract minutiae from the fingerprint image obtained through the reconfiguration, and generate a sensing pattern including the extracted minutiae.

The pattern matching unit 150 matches the sensing pattern to a registration pattern. The registration pattern is a pattern of minutiae for a registered fingerprint and is stored in the storage unit 160. The pattern matching unit 150 authenticates the fingerprint data on the basis of a matching result of the sensing pattern. For example, the pattern matching unit 150 can authenticate that a fingerprint of the received fingerprint data is the same as a registered fingerprint when the number of minutiae of the sensing pattern which correspond with those of the registration pattern is not less than a predetermined value. However, the present disclosure is not limited to the number of minutiae, and thus the pattern matching unit 150 can determine whether the sensing pattern corresponds with the rotated registration pattern on the basis of other factor such as the number of lines between minutiae and shape of the minutiae.

When the received fingerprint data is authenticated in the pattern matching unit 150, the pattern matching unit 150 can extract a pattern of minutiae not shown in the registration pattern, from among the minutiae of the sensing pattern. The extracted pattern of minutiae can be output to the pattern transformation unit 140.

The pattern transformation unit 140 can add the pattern of minutiae received from the pattern matching unit 150 to the registration pattern to expand the registration pattern. Further detailed descriptions about this operation will be provided with reference to FIG. 6.

The storage unit 160 updates a stored registration pattern into an expanded registration pattern.

The pattern extraction unit 130, the pattern matching unit 150, and the pattern transformation unit 140 according to the present embodiment can correspond to or include at least one processor.

When the fingerprint data received through the fingerprint sensing is authenticated, the fingerprint authentication device 100 according to the present embodiment can receive a pattern of minutiae not shown in the registration pattern, from among the minutiae of the received fingerprint data, and can add the received pattern of minutiae to the registration pattern to thereby expand the registration pattern. Therefore, as the fingerprint sensing of the fingerprint sensor 110 is repeated, the registration pattern stored in the storage unit 160 can be expanded.

According to another embodiment of the present disclosure, the fingerprint authentication device 100 can further include the rotation sensing unit 120. The rotation detection unit 120 detects the degree of rotation of the fingerprint authentication device 100 when a fingerprint is sensed. The pattern transformation unit 140 can add the pattern of minutiae not shown in the registration pattern to the registration pattern according to the degree of rotation detected by the rotation sensing unit 120, thereby expanding the registration pattern. Accordingly, the registration pattern can be expanded according to the degree of rotation, improving the accuracy of fingerprint recognition.

According to still another embodiment of the present disclosure, the fingerprint authentication device 100 can expand a registration pattern in order to register a fingerprint through the fingerprint sensor 110. The fingerprint authentication device 100 can request a user to swipe a finger N times in order to sense and register a fingerprint, and can generate a registration pattern based on N number of pieces of fingerprint registration data obtained through the fingerprint sensing.

The fingerprint sensor 110 can obtain first to N-th fingerprint registration data through N number of times of fingerprint sensing. The pattern extraction unit 130 can extract first to N-th registration patterns from the first to Nth fingerprint registration data. The pattern matching unit 150 can match the second to Nth registration patterns to the first registration pattern, and extract a pattern of minutiae not shown in the first registration pattern, from among the minutiae of the second to Nth registration patterns. The pattern transformation unit 140 can generate a registration pattern by adding the extracted pattern of minutiae to the first registration pattern. The storage unit 160 can store the generated registration pattern.

According to still another embodiment of the present disclosure, the fingerprint authentication device 100 can expand a registration pattern according to the degree of rotation in order to register a fingerprint through the fingerprint sensor 110. In the previous embodiment, the rotation sensing unit 120 can receive the degree of first rotation of the fingerprint authentication device 100 at the time of obtaining the first fingerprint registration data and the degree of second rotation of the fingerprint device 100 at the time of obtaining the second fingerprint registration data. The pattern transformation unit 140 can rotate the first and second registration patterns according to the degrees of first and second rotation respectively, and then match the rotated second registration pattern to the rotated first registration pattern. The fingerprint authentication device 100 can rotate each registration pattern according to the degree of rotation detected by the rotation sensing unit 120 to match the rotated registration patterns, and then generate a single registration pattern. Accordingly, the registration pattern can be efficiently expanded according to the degree of rotation.

FIGS. 5A to 5D are diagrams illustrating that the registration pattern is expanded by repeatedly sensing a fingerprint according to an embodiment of the present disclosure.

Figure 5A:
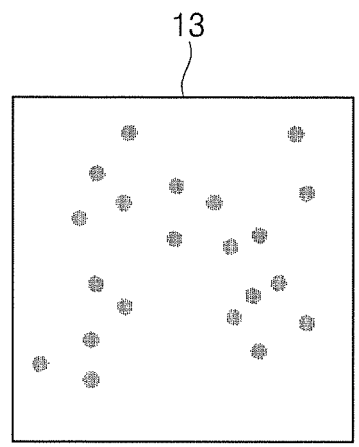
FIGS. 5A to 5D are diagrams illustrating that a registration pattern is expanded by repeatedly sensing a fingerprint according to an embodiment of the present disclosure.
Figure 5B:
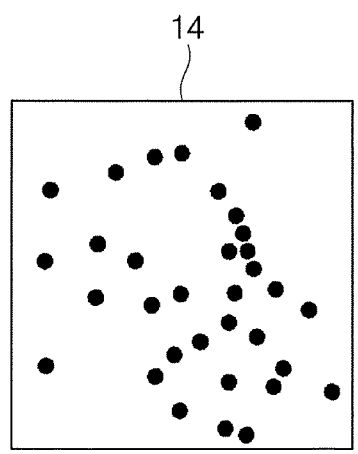
Figure 5C:
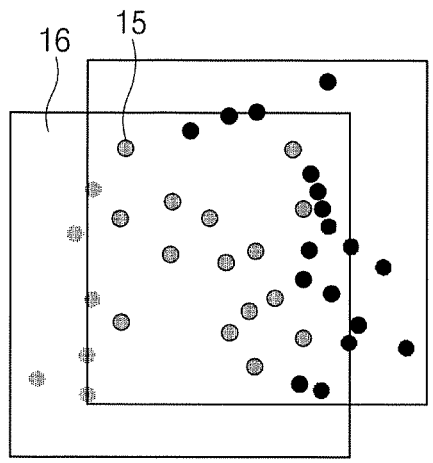
Figure 5D:
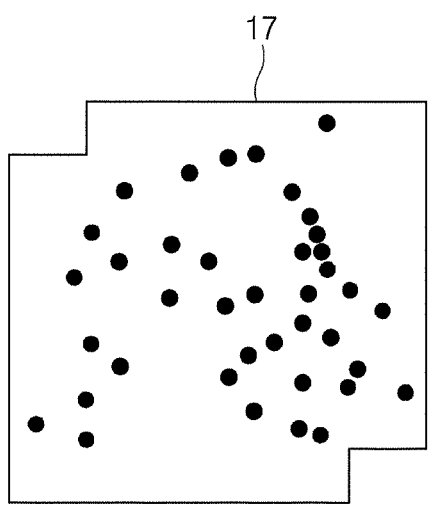

FIG. 5A illustrates the sensing pattern 13 extracted from the fingerprint data obtained by the fingerprint sensor 110. FIG. 5B illustrates the registration pattern 14 comprising minutiae for a registered fingerprint. As illustrated in FIG. 5C, the pattern matching unit 150 matches the sensing pattern 13 to the registration pattern 14. In FIG. 5C, the minutiae 15 indicate corresponding minutiae between the sensing pattern 13 and the registration pattern 14. The pattern matching unit 150 can determine that the fingerprint authentication is successful when the number of the minutiae 15 is not less than a predetermined value.

When the fingerprint authentication is successful using the fingerprint data received through fingerprint sensing, the pattern matching unit 150 can extract a pattern of minutiae 16 not shown in the registration pattern 14, from among the minutiae of the sensing pattern 13. The pattern transformation unit 140 can add the extracted pattern of minutiae 16 to the registration pattern 14. Accordingly, an expanded registration pattern 17 can be generated and replace the previous registration pattern 14 in order to be stored in the storage unit 160.

In the present embodiment, the degree of rotation of the sensing pattern 13 is not considered when the registration pattern 14 is expanded. However, according to another embodiment of the present disclosure, the fingerprint authentication device 100 can expand the registration pattern 14 according to the degree of rotation. That is, the pattern transformation unit 140 can add the pattern of minutiae 16 not shown in the registration pattern 14 to the registration pattern 14 according to the degree of rotation detected by the rotation sensing unit 120, so as to generate the expanded registration pattern 17. Accordingly, the registration pattern can be efficiently expanded according to the degree of rotation.

As described above, the fingerprint authentication device 100 can expand the registration pattern as the fingerprint sensor 110 repeats fingerprint sensing. As the fingerprint sensing is repeated, the registration pattern can be further expanded, improving the accuracy and rate of fingerprint recognition.

FIGS. 6A to 6G are diagrams illustrating that the registration pattern is expanded when a fingerprint is registered according to an embodiment of the present disclosure. In the present embodiment, a mobile terminal 200 is exemplarily used as the fingerprint authentication device 100. However, the present disclosure is not limited thereto, and thus, the mobile terminal 200 according to the present embodiment can include an electronic device such as a mobile phone, a smartphone, a notebook computer, a terminal for digital broadcast, a digital camera, a portable game terminal, a personal digital assistant (PDA), a portable multimedia player (PMP), a navigator, and a tablet personal computer (PC).

Figure 6A:
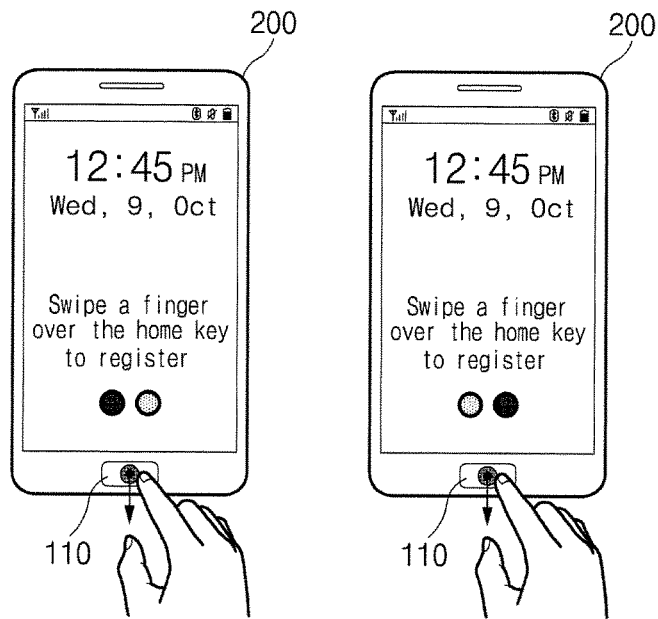
FIGS. 6A to 6G are diagrams illustrating that a registration pattern is expanded when a fingerprint is registered according to an embodiment of the present disclosure.

FIG. 6A illustrates that first fingerprint registration data and second fingerprint registration data are obtained, according to an embodiment of the present disclosure. When a fingerprint is registered, the mobile terminal 200 can display a screen as illustrated in FIG. 6A through an output unit 230. As illustrated in FIG. 6A, a user swipes a finger on the fingerprint sensor 110 twice in order to register first and second fingerprints. FIG. 6A illustrates that the first fingerprint registration data and the second fingerprint registration data are obtained with the same degree of rotation.

Figure 6B:
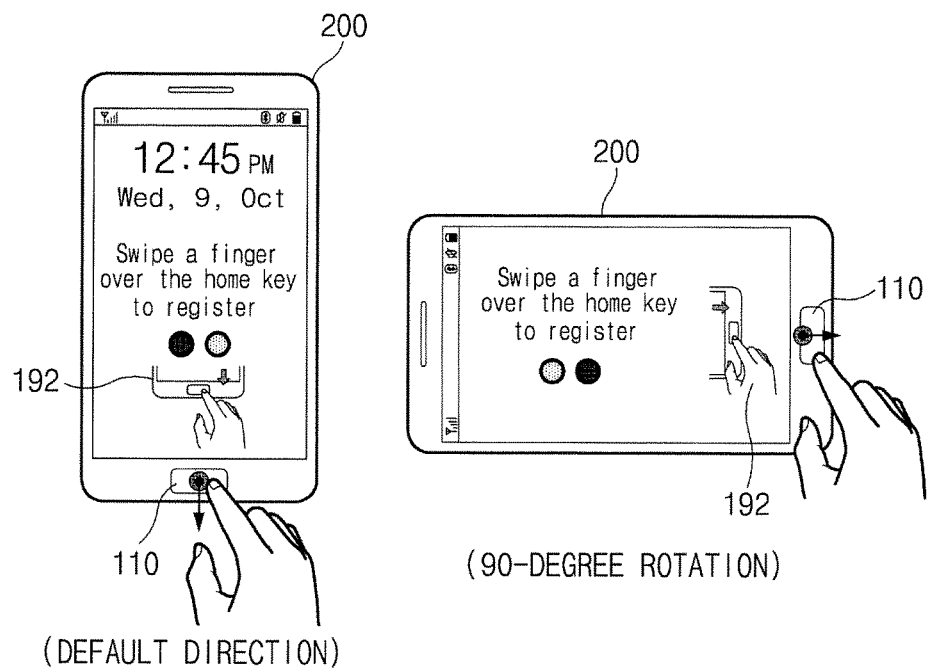

FIG. 6B illustrates that the first fingerprint registration data and the second fingerprint registration data are obtained with different degrees of rotation. When a fingerprint is registered, as illustrated in FIG. 6B, a guide 192 can be output so that the user performs finger swiping for the first and second fingerprint registration with a predetermined degree of rotation. As illustrated in FIG. 6B, the mobile terminal 200 can obtain the first fingerprint registration data through fingerprint swiping performed in a default direction, and can obtain the second fingerprint registration data through fingerprint swiping performed in a 90-degree rotated direction.

Figure 6C:
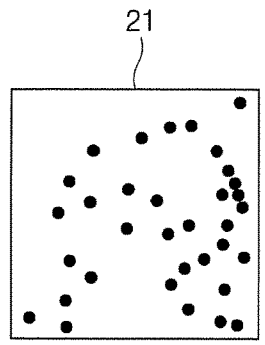
Figure 6D:
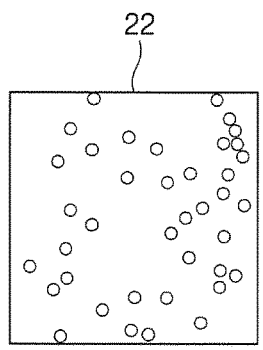
Figure 6E:
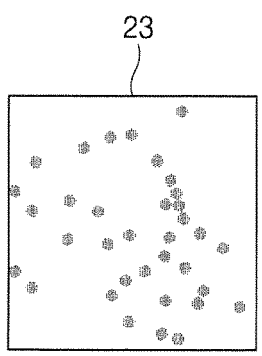

FIG. 6C illustrates a first registration pattern 21 extracted from the first fingerprint registration data obtained by the fingerprint sensor 110. FIG. 6D illustrates a second registration pattern 22 extracted from the second fingerprint registration data. FIG. 6E illustrates a third registration pattern 23 extracted from third fingerprint registration data.

Here, it is assumed that the first registration pattern 21 and the second registration pattern 22 are obtained through fingerprint swiping performed twice in the default direction, and the third registration pattern 23 is obtained through fingerprint swiping performed in the 90-degree rotated direction.

Figure 6F:
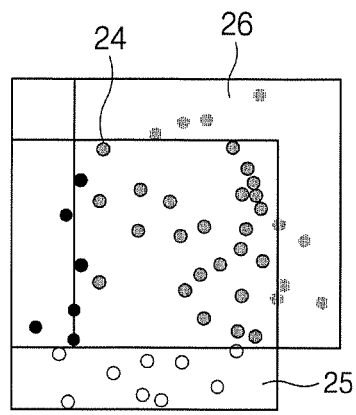
Figure 6G:
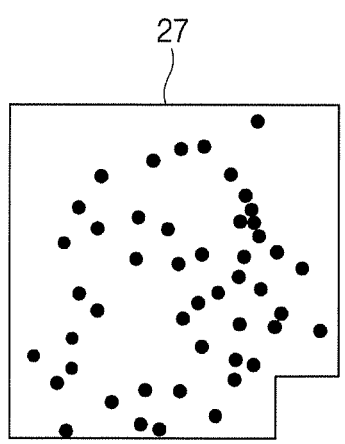

As illustrated in FIG. 6F, the pattern matching unit 150 matches the second registration pattern 22 and the third registration pattern 23 to the first registration pattern 21. In FIG. 6(f), minutiae 24 indicate corresponding minutiae among the three registration patterns. A pattern of minutiae 25 indicates a pattern of minutiae not shown in the first registration pattern 21 from among the minutiae of the second registration pattern 22. A pattern of minutiae 26 indicates a pattern of minutiae not shown in the first registration pattern 21 from among the minutiae of the third registration pattern 23. The pattern matching unit 150 can extract the patterns of minutiae 25 and 26 not shown in the first registration pattern. The pattern transformation unit 140 can add the extracted patterns of minutiae 25 and 26 to the first registration pattern 21. Accordingly, an expanded registration pattern 27 can be generated and is stored in a storage unit 210.

In the present embodiment, a registration pattern is expanded when a fingerprint is registered using three registration patterns. However, the present disclosure is not limited thereto, and thus, the mobile terminal 200 can request a user to swipe a finger N times in order to sense and register a fingerprint, and can generate a registration pattern based on N number of pieces of fingerprint registration data obtained through the fingerprint sensing.

Furthermore, in the present embodiment, a registration pattern is expanded using registration patterns obtained through fingerprint swiping performed in the default direction and the 90-degree rotated direction. However, the present disclosure is not limited thereto, and thus, the fingerprint registration data can be obtained with various degrees of rotation of the mobile terminal 200, and the registration pattern can be efficiently expanded based on the obtained fingerprint registration data. As described above, the accuracy of fingerprint recognition can be improved by registering an expanded registration pattern when a fingerprint is registered by the fingerprint authentication device 100.

Figure 7:
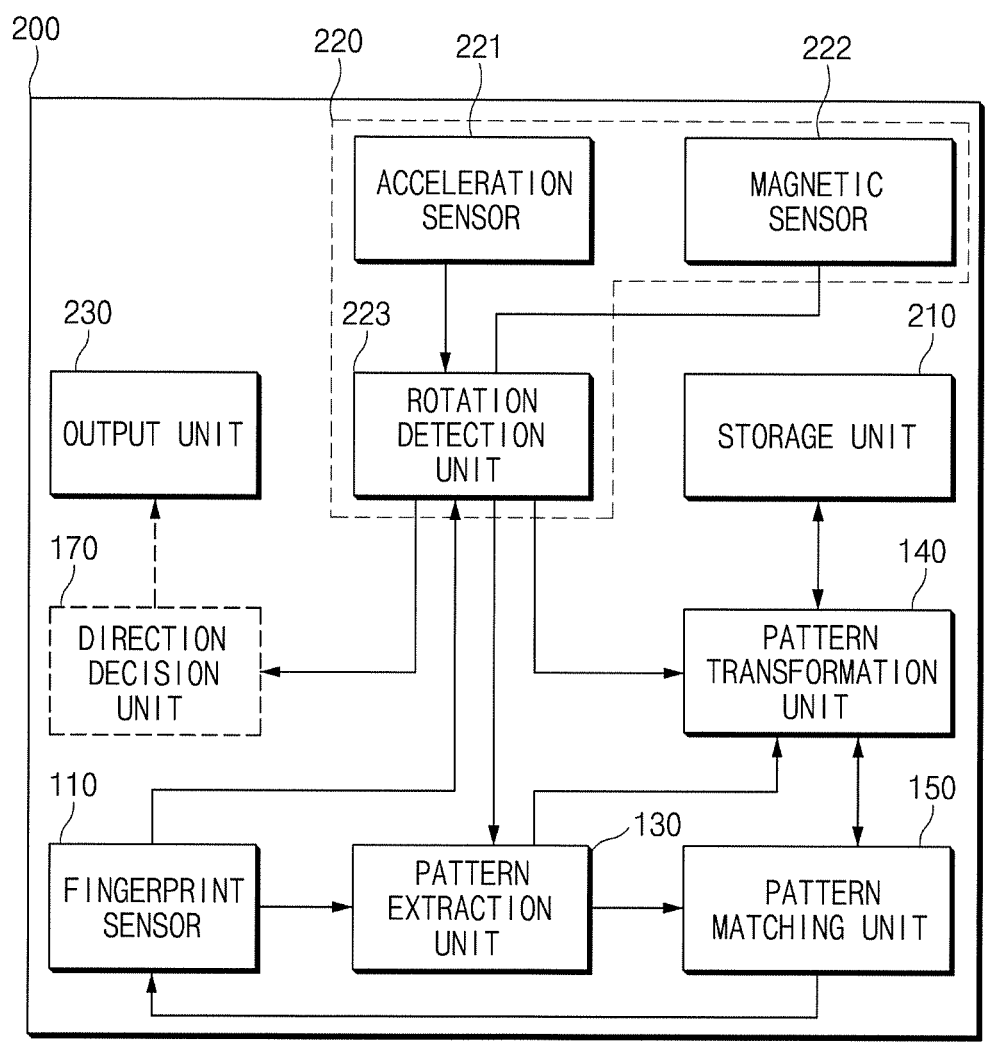
FIG. 7 is a block diagram illustrating a mobile terminal including a fingerprint authentication device according to an embodiment of the present disclosure.

FIG. 7 is a block diagram illustrating a mobile terminal including the fingerprint authentication device according to an embodiment of the present disclosure. The mobile terminal 200 according to the present embodiment can include an electronic device such as a mobile phone, a smartphone, a notebook computer, a terminal for digital broadcast, a digital camera, a portable game terminal, a personal digital assistant (PDA), a portable multimedia player (PMP), a navigator, and a tablet personal computer (PC). Referring to FIG. 7, the mobile terminal 200 can include a fingerprint sensor 110, an acceleration sensor 221, a magnetic sensor 222, a rotation detection unit 223, a pattern extraction unit 130, a pattern matching unit 150, a pattern transformation unit 140, a direction decision 170, a storage unit 210, and an output unit 230.

The mobile terminal 200 is an example of the fingerprint authentication device 100. The above descriptions with reference to FIGS. 1 to 6 can also be applied to the mobile terminal 200 of FIG. 7. Therefore, overlapping descriptions will not be provided.

Only components related to the present embodiment will be described in order not to obscure the present embodiment. Those skilled in the art understand that general components other than the components illustrated in FIG. 3 can be further included.

The fingerprint sensor 110 senses a fingerprint. The fingerprint sensor 110 can be provided to a home button of the mobile terminal 200. However, the fingerprint sensor 110 is not limited thereto, and thus can be arranged on the back or side of the mobile terminal 200 or can be integrated with a screen.

The acceleration sensor 221 detects vibration or impact applied to the mobile terminal 200 or detects a change of a velocity of the mobile terminal 200 so as to detect a movement state or a motion state of a user of the mobile terminal 200.

The magnetic sensor 222 can recognize a movement or a location of an object using terrestrial magnetism.

The rotation detection unit 223 detects the degree of rotation of the mobile terminal 200 when a fingerprint is sensed by the fingerprint sensor 110, by using the acceleration sensor 221 or the magnetic sensor 222.

The pattern extraction unit 130 extracts a sensing pattern that is a pattern of minutiae for sensed fingerprint from the fingerprint data obtained by the fingerprint sensor 110.

The pattern transformation unit 140 rotates a registration pattern according to the degree of rotation of the mobile terminal 200 of when a fingerprint is sensed by the fingerprint sensor 110.

The pattern matching unit 150 matches the sensing pattern to the rotated registration pattern, and authenticates the fingerprint data. For example, the pattern matching unit 150 can authenticate the fingerprint data when the number of minutiae of the sensing pattern which correspond with those of the rotated registration pattern is not less than a predetermined value. However, the present disclosure is not limited to the number of minutiae, and thus the pattern matching unit 150 can determine whether the sensing pattern corresponds with the rotated registration pattern on the basis of other factor such as the number of lines between minutiae and shape of the minutiae.

The storage unit 210 stores a registration pattern that is a pattern of minutiae for a registered fingerprint. The storage unit 210 can be a typical storage medium that stores data or a program needed to extract patterns from fingerprint data and transform and match the patterns. Furthermore, the storage unit 210 can store data or a program for operating the mobile terminal 200. The storage unit 210 according to the present embodiment can be implemented with a hard disk drive (HDD), a read only memory (ROM), a random access memory (RAM), a flash memory, a memory card, or a solid state drive (SDD).

The direction decision 170 can suggest a fingerprint sensing direction corresponding to the degree of rotation of the mobile terminal 200. The direction decision 170 can provide a guide for indicating the fingerprint sensing direction corresponding to the received degree.

The output unit 180 outputs the guide for fingerprint authentication according to the fingerprint sensing direction. Furthermore, the output unit 180 can output a voice, a letter, a picture, or a video indicating whether the fingerprint authentication is successful or not. The output unit 180 can be a display panel, a touch screen, a speaker, and a vibration sensor provided to the mobile terminal 200.

Figure 8:
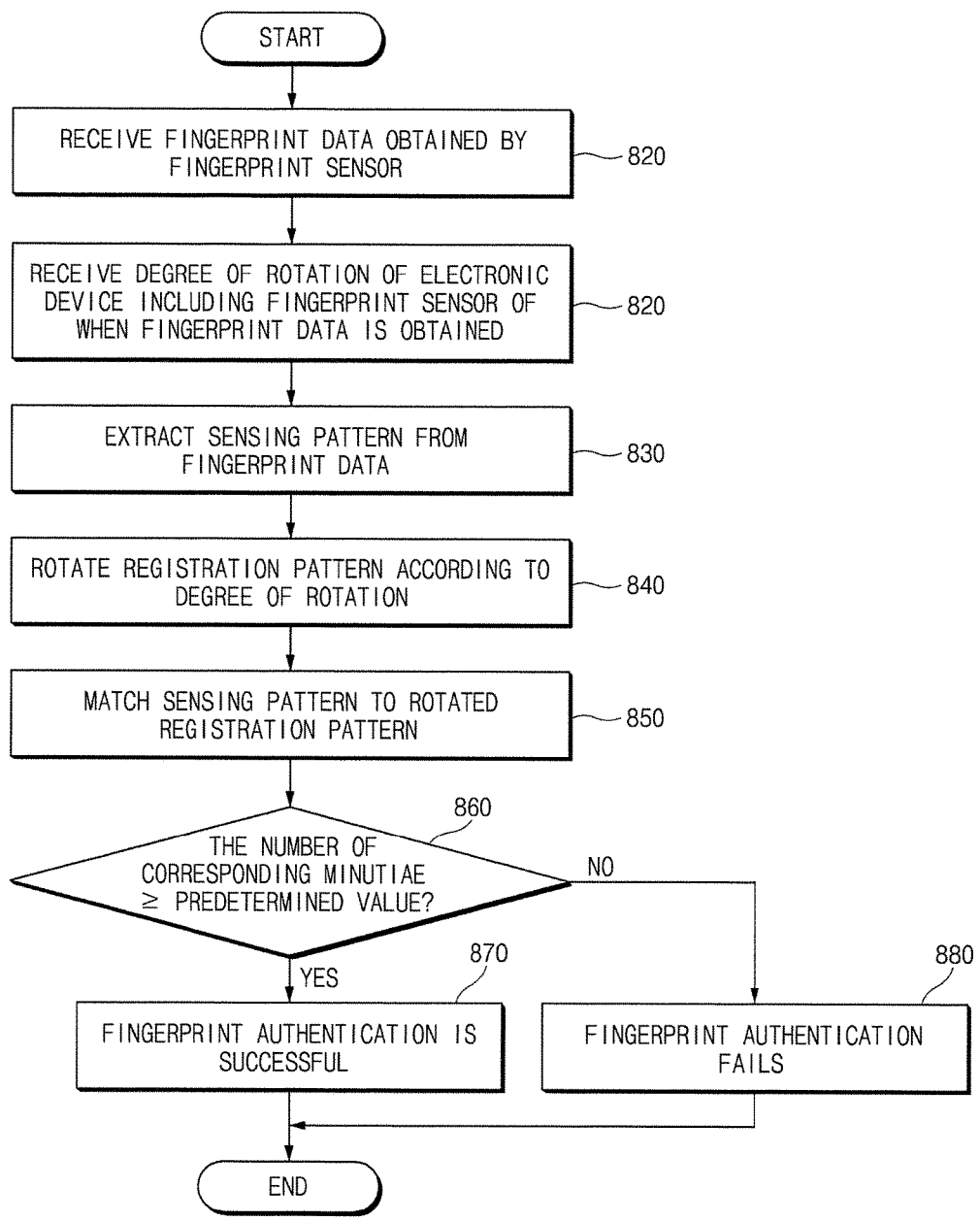
FIG. 8 is a flowchart illustrating a fingerprint authentication method according to an embodiment of the present disclosure.

FIG. 8 is a flowchart illustrating a fingerprint authentication method according to an embodiment of the present disclosure. The flowchart of FIG. 8 can include operations performed in a time series manner in the fingerprint authentication device 100, the mobile terminal 200, or the electronic device illustrated in FIGS. 1 to 7. Therefore, it can be understood that the above descriptions of the fingerprint authentication device 100, the mobile terminal 200, or the electronic device illustrated in FIGS. 1 to 7 are also applied to the flowchart of FIG. 8.

In operation 810, the fingerprint authentication device 100 receives fingerprint data obtained by the fingerprint sensor 110. The fingerprint data is obtained by a sensing operation of the fingerprint sensor 110.

In operation 820, the fingerprint authentication device 100 receives the degree of rotation of the electronic device including the fingerprint sensor 110 of when the fingerprint data is obtained. The rotation sensing unit 120 can be arranged in or outside the fingerprint authentication device 100.

In operation 830, the pattern extraction unit 130 extracts a sensing pattern from the fingerprint data.

In operation 840, the pattern transformation unit 140 rotates the registration pattern according to the degree of rotation.

In operation 850, the pattern matching unit 150 matches the sensing pattern to a rotated registration pattern. The sensing pattern can be matched to the registration pattern based on corresponding minutiae.

In operation 860, the pattern matching unit 150 determines whether the number of minutiae of the sensing pattern which correspond with those of the rotated registration pattern is not less than a predetermined value. The process proceeds to operation 860 when the pattern matching unit 150 determines that the number of the corresponding minutiae is not less than the predetermined value, or the process proceeds to operation 870 when the pattern matching unit 150 determines that the number of the corresponding minutiae is less than the predetermined value. However, the present disclosure is not limited to the number of minutiae, and thus the pattern matching unit 150 can determine whether the sensing pattern corresponds with the rotated registration pattern on the basis of other factor such as the number of lines between minutiae and shape of the minutiae.

In operation 870, the fingerprint authentication device 100 confirms that the fingerprint authentication is successful.

In operation 880, the fingerprint authentication device 100 confirms that the fingerprint authentication fails.

According to an embodiment, the authentication device 100 can be further provided with the output unit 180 in order to output a voice, a letter, or a video indicating whether the fingerprint authentication is successful or not.

Figure 9:
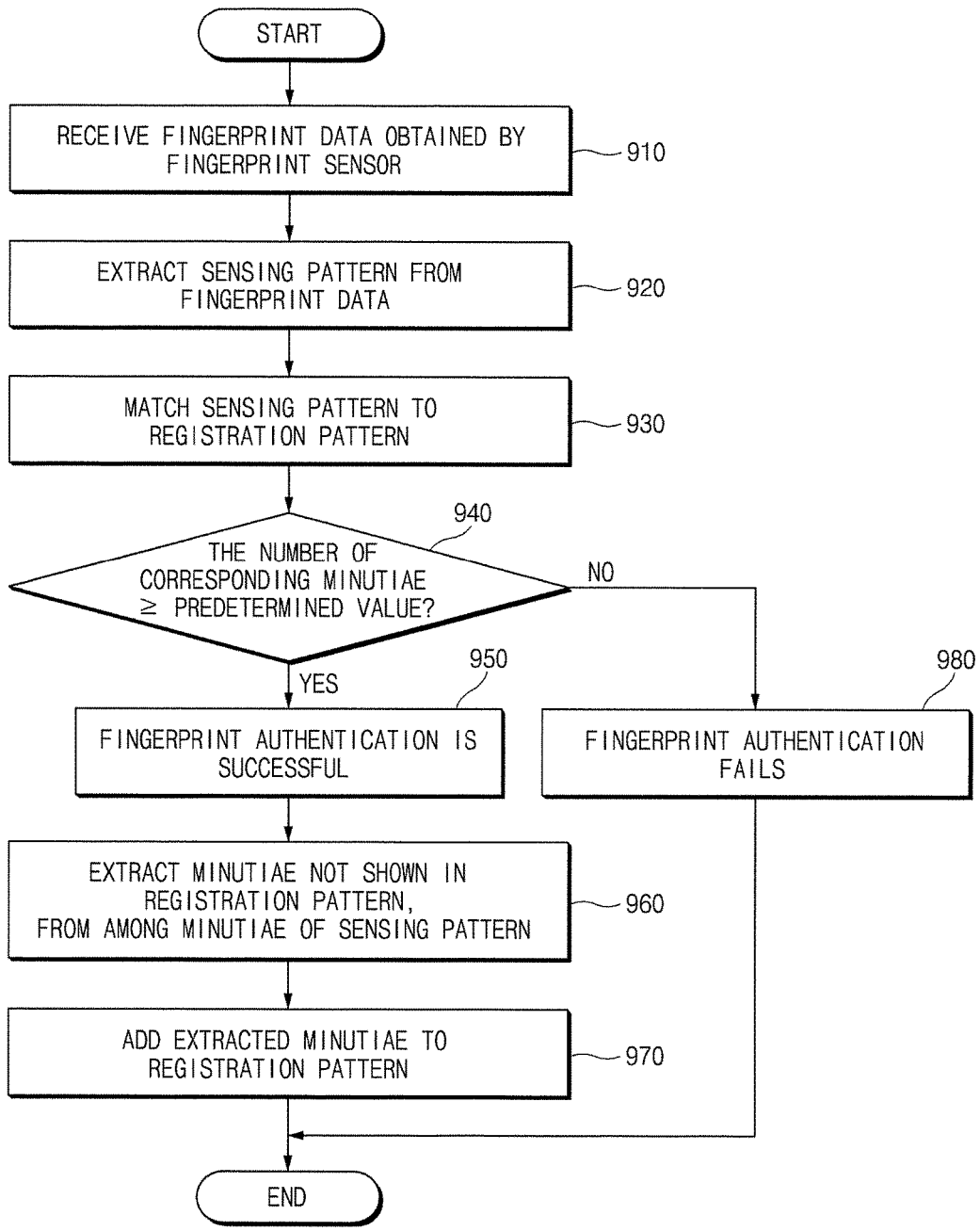
FIG. 9 is a flowchart illustrating a fingerprint authentication method according to an embodiment of the present disclosure.

FIG. 9 is a flowchart illustrating a fingerprint authentication method according to an embodiment of the present disclosure.

In operation 910, the fingerprint authentication device 100 receives fingerprint data obtained by the fingerprint sensor 110. The fingerprint data is obtained by a sensing operation of the fingerprint sensor 110.

In operation 920, the pattern extraction unit 130 extracts a sensing pattern. The sensing pattern indicates a pattern of minutiae extracted from the fingerprint data.

In operation 930, the pattern matching unit 150 matches the sensing pattern to a registration pattern.

In operation 940, the pattern matching unit 150 determines whether the number of minutiae of the sensing pattern which correspond with those of a rotated registration pattern is not less than a predetermined value. The process proceeds to operation 950 when the pattern matching unit 150 determines that the number of the corresponding minutiae is not less than the predetermined value, or the process proceeds to operation 980 when the pattern matching unit 150 determines that the number of the corresponding minutiae is less than the predetermined value. However, the present disclosure is not limited to the number of minutiae, and thus the pattern matching unit 150 can determine whether the sensing pattern corresponds with the rotated registration pattern on the basis of other factor such as the number of lines between minutiae and shape of the minutiae.

In operation 950, the fingerprint authentication device 100 confirms that the fingerprint authentication is successful.

In operation 960, the pattern matching unit 150 extracts a pattern of minutiae not shown in the registration pattern, from among the minutiae of the sensing pattern.

In operation 970, the pattern transformation unit 140 adds the extracted minutiae to the registration pattern. According to another embodiment of the present disclosure, the fingerprint authentication device 100 can expand the registration pattern as the fingerprint sensor 110 repeats fingerprint sensing.

In operation 980, the fingerprint authentication device 100 confirms that the fingerprint authentication fails.

Figure 10:
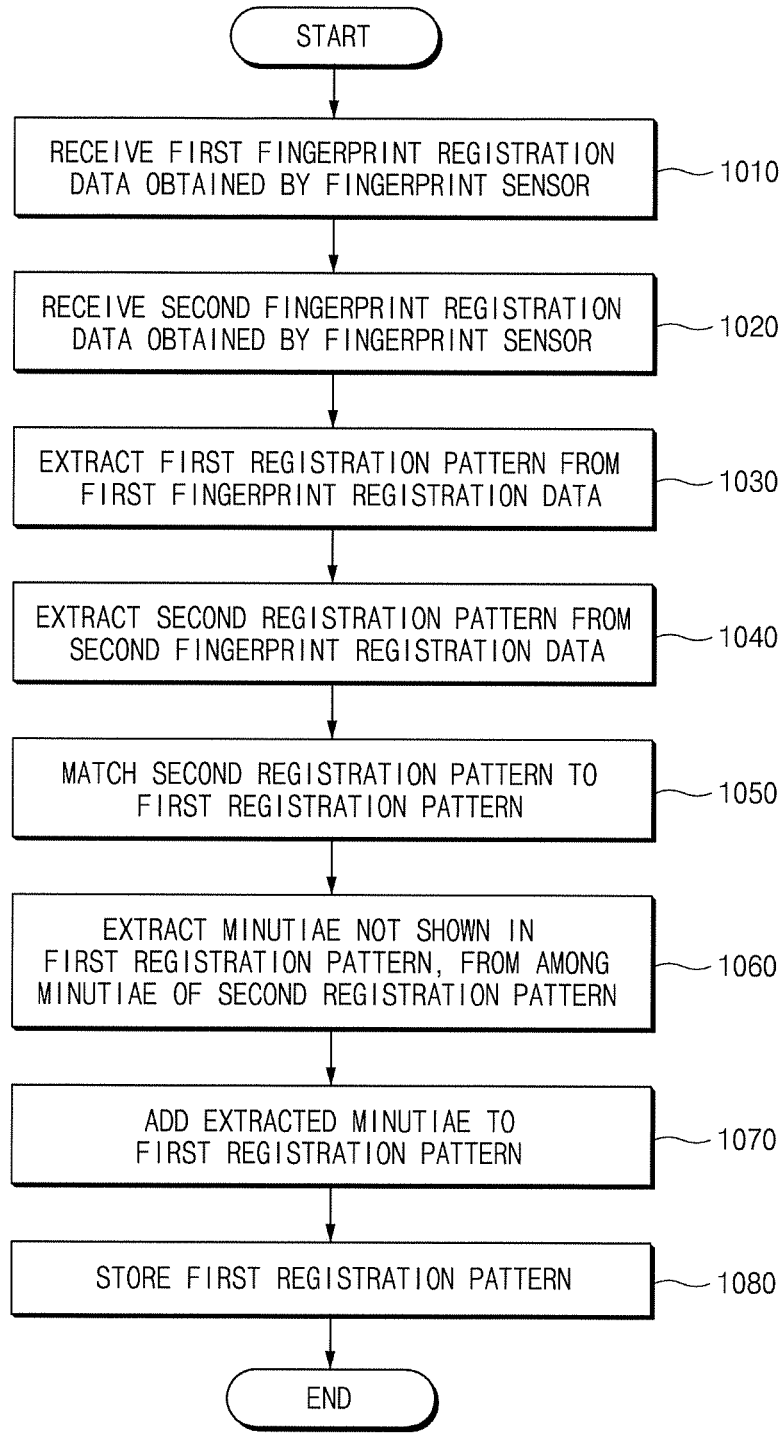
FIG. 10 is a flowchart illustrating a fingerprint authentication method according to an embodiment of the present disclosure.

FIG. 10 is a flowchart illustrating a fingerprint authentication method according to an embodiment of the present disclosure.

In operation 1010, the fingerprint authentication device 100 receives first fingerprint registration data obtained by the fingerprint sensor 110.

In operation 1020, the fingerprint authentication device 100 receives second fingerprint registration data obtained by the fingerprint sensor 110.

In operation 1030, the pattern extraction unit 130 extracts a first registration pattern from the first fingerprint registration data. In operation 1040, the pattern extraction unit 130 extracts a second registration pattern from the second fingerprint registration data.

In operation 1050, the pattern matching unit 150 matches the second registration pattern to the first registration pattern.

In operation 1060, the pattern matching unit 150 extracts a pattern of minutiae not shown in the first registration pattern, from among the minutiae of the second registration pattern.

In operation 1070, the pattern transformation unit 140 adds the extracted pattern to the first registration pattern. Accordingly, the fingerprint authentication device 100 can generate an expanded registration pattern. According to another embodiment of the present disclosure, the fingerprint authentication device 100 can expand the registration pattern according to the degree of rotation.

In operation 1080, the first registration pattern is stored in the storage unit 160.

As described above, the sensing direction can be changed when the electronic device including the fingerprint sensor rotates, and thus, convenience of a user can be improved. Furthermore, the fingerprint authentication device expands a registration pattern as the fingerprint sensor repeats fingerprint sensing. Therefore, the accuracy and rate of fingerprint recognition of the fingerprint sensor can be improved.

In this disclosure, an element expressed as a means for performing a specific function includes an arbitrary method for performing the specific function. Such an element may include any type of software including firmware or a microcode combined with a combination of circuits for performing the specific function or a circuit suitable for performing software for performing the specific function.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, other electronic units designed to perform the functions described herein, or a selective combination thereof. The controllers can comprise any conventional control means such as relay technology, ASICs, FPGA, programmable micro-controllers and micro-processors. In some embodiments, various components such as a pattern extraction unit, pattern matching unit and pattern transformation unit can be incorporated in a controller.

In this disclosure, the term "an embodiment" or various modified expressions thereof indicate that specific features, structures, and characteristics related to this embodiment are included in at least one embodiment of the principle of the present disclosure. Therefore, the term "in an embodiment" and various modified expressions thereof should not be construed as indicating the same embodiment.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A fingerprint authentication method comprising:
obtaining a fingerprint data through a fingerprint sensor;
detecting a degree of rotation of an electronic device including the fingerprint sensor by using a magnetic sensor or an acceleration sensor of the electronic device when the fingerprint data is obtained;
extracting a pattern of minutiae from the fingerprint data;
rotating either a registration pattern stored in a memory based on the degree of rotation of the electronic device, or the pattern of minutiae based on the degree of rotation of the electronic device;
matching either the pattern of minutiae to a rotated registration pattern based on the degree of rotation, or the registration pattern to a rotated pattern of minutiae based on the degree of rotation;
authenticating the fingerprint data on a basis of a match result;
expanding the registration pattern by adding an unregistered pattern of minutiae not shown in the registration pattern among patterns of the minutiae, to the registration pattern after the fingerprint data is authenticated; and
storing the expanded registration pattern.

2. The fingerprint authentication method according to claim 1, wherein expanding the registration-pattern includes expanding the registration pattern by adding the unregistered pattern of minutiae based on the degree of rotation.

3. The fingerprint authentication method according to claim 1, further comprising:
registering the registration pattern,
wherein the registering-the-registration-pattern includes:
obtaining first fingerprint registration data through the fingerprint sensor;
obtaining second fingerprint registration data through the fingerprint sensor;
extracting a first registration pattern from the first fingerprint registration data;
extracting a second registration pattern from the second fingerprint registration data;
matching the second registration pattern to the first registration pattern;
generating the registration pattern by adding a pattern of minutiae not shown in the first registration pattern among minutiae of the second registration pattern, to the first registration pattern; and
storing the registration pattern.

4. The fingerprint authentication method according to claim 3, wherein the registering-the-registration-pattern includes:
detecting a first degree of rotation of the electronic device of when the first fingerprint registration data is obtained;
detecting a second degree of rotation of the electronic device of when the second fingerprint registration data is obtained; and
rotating the first registration pattern based on the first degree of rotation and the second registration pattern based on the second degree of rotation,
wherein the matching-the-second-registration-pattern-to-the-first-registation-pattern includes matching the rotated first registration pattern to the rotated second registration pattern.

5. The fingerprint authentication method according to claim 4, wherein the registering-the-registration-pattern includes:
providing a first guide for indicating a first fingerprint sensing direction for the first registration pattern; and
providing a second guide for indicating a second fingerprint sensing direction for the second registration pattern, the second fingerprint sensing direction being different from the first fingerprint sensing direction.

6. The fingerprint authentication method according to claim 1, further comprising:

providing a guide for indicating a fingerprint sensing direction corresponding to the degree of rotation.

7. A non-transitory computer-readable recording medium in which stores a program for performing a method comprising:
obtaining a fingerprint data through a fingerprint sensor;
detecting a degree of rotation of an electronic device including the fingerprint sensor when the fingerprint data is obtained;
extracting a pattern of minutiae from the fingerprint data;
rotating either a registration pattern stored in a memory based on the degree of rotation, or the pattern of minutiae based on the degree of rotation;
matching either the pattern of minutiae to rotated registration pattern based on the degree of rotation, or the registration pattern to rotated pattern of minutiae based on the degree of rotation;
authenticating the fingerprint data on a basis of a match result;
expanding the registration pattern by adding an unregistered pattern of minutiae not shown in the registration pattern among the minutiae of the pattern, to the registration pattern after the fingerprint data is authenticated; and
storing the expanded registration pattern.

8. A fingerprint authentication device comprising:
a fingerprint sensor configured to obtain a fingerprint data;
a rotation sensor configured to detect a degree of rotation of the fingerprint authentication device;
a memory configured to store a registration pattern for a registered fingerprint;
a processor electrically connected to the fingerprint sensor, the rotation sensor and the memory;
wherein the processor is configured to:
extract a pattern of minutiae from a fingerprint data when the fingerprint data is obtained;
match the pattern of minutiae to the registration pattern;
authenticate the fingerprint data on a basis of a match result;
determine an unregistered pattern of minutiae not shown in the registration pattern among the minutiae of the pattern after the fingerprint data is authenticated; and
expand the registration pattern by adding the unregistered pattern of minutiae to the registration pattern based on the degree of rotation.

9. The fingerprint authentication device according to claim 8, wherein
the fingerprint sensor is configured to obtain first fingerprint registration data and second fingerprint registration data;
the processor is configured to extract a first registration pattern from the first fingerprint registration data and extract a second registration pattern from the second fingerprint registration data;
the processor is configured to match the second registration pattern to the first registration pattern, and extract a pattern of minutiae, that is not shown in the first registration pattern among minutiae of the second registration pattern; and
the processor is configured to generate the registration pattern by adding the extracted pattern of minutiae to the first registration pattern.

10. The fingerprint authentication device according to claim 9, further comprising:

a rotation sensor configured to detect a first degree of rotation of the fingerprint authentication device when the first fingerprint registration data is obtained and a second degree of rotation of the fingerprint authentication device when the second fingerprint registration data is obtained,
wherein the processor is configured to rotate the first registration pattern based on the first degree of rotation and the second registration pattern based on the second degree of rotation, and
wherein the processor is configured to match the rotated first registration pattern to the rotated second registration pattern.

11. The fingerprint authentication device according to claim 10,
wherein the processor is configured to determine whether the first degree of rotation corresponds to a first fingerprint sensing direction for the first registration pattern and whether the second degree of rotation corresponds to a second fingerprint sensing direction for the second registration pattern, the second fingerprint sensing direction being different from the first fingerprint sensing direction.

12. The fingerprint authentication device according to claim 11, further comprising:
a display configured to output a request for re-scanning the fingerprint when the first and second fingerprint sensing direction does not correspond with its detected degree of rotation.

13. The fingerprint authentication device according to claim 8, further comprising:
a rotation sensor configured to detect a degree of rotation of the fingerprint authentication device; and
wherein the processor is configured to determine a fingerprint sensing direction corresponding to the degree of rotation.

14. A mobile terminal comprising:
a fingerprint sensor configured to obtain a fingerprint data;
a magnetic sensor;
an acceleration sensor;
a memory configured to store a registration pattern for a registered fingerprint; and
a processor electrically connected to the fingerprint sensor, the magnetic sensor, the acceleration sensor and the memory;
wherein the processor is configured to:
detect a degree of rotation of the mobile terminal by using the magnetic sensor or the acceleration sensor when the fingerprint data is obtained;
extract a pattern of minutiae from the fingerprint data;
rotate the registration pattern based on the degree of rotation of the mobile terminal when the fingerprint data is obtained;
match the pattern of minutiae to the registration pattern; and
authenticate the fingerprint data on a basis of a match result;
expand the registration pattern by adding an unregistered pattern of minutiae not shown in the registration pattern among the minutiae of the pattern, to the registration pattern after the fingerprint data is authenticated; and
cause the memory to store the expanded registration pattern.

15. The mobile terminal according to claim 14, wherein
the fingerprint sensor is configured to obtain first fingerprint registration data and second fingerprint registration data;
the processor is configured to extract a first registration pattern from the first fingerprint registration data and extract a second registration pattern from the second fingerprint registration data;
the processor is configured to match the second registration pattern to the first registration pattern, and extract a pattern of minutiae not shown in the first registration pattern among minutiae of the second registration pattern; and
the processor is configured to generate the registration pattern by adding the extracted pattern of minutiae to the first registration pattern.

16. The mobile terminal according to claim 15, wherein
the processor is configured to detect a first degree of rotation of the mobile terminal when the first fingerprint registration data is obtained and a second degree of rotation of the mobile terminal when the second fingerprint registration data is obtained,
the processor is configured to rotate the first registration pattern based on the first degree of rotation and rotate the second registration pattern based on the second degree of rotation, and
the processor is configured to match the rotated first registration pattern to the rotated second registration pattern.

17. The mobile terminal according to claim 14, wherein the processor is configured to determine a fingerprint sensing direction corresponding to the degree of rotation.

* * * * *